(12) United States Patent
Davin

(10) Patent No.: US 9,058,907 B2
(45) Date of Patent: Jun. 16, 2015

(54) METHOD TO EXTRACT TRITIUM FROM IRRADIATED BOILING WATER REACTOR CONTROL ROD BLADES

(75) Inventor: Peter F. Davin, Jefferson Hills, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 529 days.

(21) Appl. No.: 13/612,917

(22) Filed: Sep. 13, 2012

(65) Prior Publication Data

US 2013/0279641 A1    Oct. 24, 2013

Related U.S. Application Data

(60) Provisional application No. 61/636,057, filed on Apr. 20, 2012.

(51) Int. Cl.
| | | |
|---|---|---|
| *G21C 19/42* | (2006.01) | |
| *G21C 19/34* | (2006.01) | |
| *G21F 9/30*  | (2006.01) | |

(52) U.S. Cl.
CPC ........... *G21C 19/34* (2013.01); *Y10T 29/49716* (2015.01); *G21F 9/30* (2013.01)

(58) Field of Classification Search
CPC ........ G21C 19/48; G21C 19/36; G21C 19/32; G21C 19/34; G21C 19/207; G21F 9/007
USPC ........................... 376/314, 260, 316; 29/401.1
See application file for complete search history.

(56) References Cited

U.S. PATENT DOCUMENTS

| 3,164,360 | A  | * | 1/1965  | Stafford ........................ 251/146 |
| 3,910,817 | A  | * | 10/1975 | Frumerman et al. .......... 376/300 |
| 4,295,401 | A  |   | 10/1981 | Mullett |
| 4,507,840 | A  | * | 4/1985  | Steinert et al. ............... 29/401.1 |
| 5,055,236 | A  | * | 10/1991 | Krieg .............................. 376/260 |
| 5,080,693 | A  | * | 1/1992  | Bourne et al. ....................... 95/8 |
| 7,477,719 | B2 | * | 1/2009  | Lunden ........................... 376/327 |
| 7,781,637 | B2 | * | 8/2010  | Russell et al. .................. 588/16 |
| 2010/0266091 | A1 | * | 10/2010 | Ahlfeld et al. ................ 376/213 |

OTHER PUBLICATIONS (The Ford Meter Box Company, Inc., Ford Service Saddles and Tapping Sleeves, available at www.fordmeterbox.com (2007).*
Shmayda (Tritium Processing Using Scanger Beds Theory and Operation; F Mannone Safety in Tritium Handling Technology; 23-52; 1993).*

* cited by examiner

*Primary Examiner* — Tashiana Adams
*Assistant Examiner* — Julia Prendergast
(74) *Attorney, Agent, or Firm* — Richard J. Coldren; Westinghouse Electric Company LLC

(57) ABSTRACT

A method for extracting tritium from irradiated boiling water reactor control rods that have cruciform-shaped. Bands of a malleable metal are wrapped around the flat portions of the blades, one band near the top of each blade panel and a second band near the bottom. The bands are crimped and an inlet penetration is formed through one of the bands and the panel and an outlet penetration is formed through the second band and the panel. A termination of each end of a closed loop conduit is sealably connected to the inlet and outlet for transporting a carrier gas through the interior of the panel. The carrier gas passing through the interior transports the tritium out of the panel to a tritium getter filter to capture the tritium. The carrier gas then recirculates through the system.

9 Claims, 4 Drawing Sheets

METHOD TO EXTRACT TRITIUM FROM IRRADIATED BOILING WATER REACTOR CONTROL ROD BLADES

CROSS REFERENCE TO RELATED APPLICATION

This application claims priority under 35 U.S.C. §119(e) from U.S. Provisional Patent Application Ser. No. 61/636,057, entitled APPARATUS AND METHOD TO EXTRACT TRITIUM FROM IRRADIATED BOILING WATER REACTOR CONTROL ROD BLADES PRIOR TO SEGMENTATION, filed Apr. 20, 2012, and is related to U.S. application Ser. No. 13/612,905, entitled METHOD OF SEGMENTING IRRADIATED BOILING WATER REACTOR CONTROL ROD BLADES.

BACKGROUND

1. Field

This invention relates generally to the decommissioning of spent boiling water reactor control rods and more particularly to the removal of tritium from those control rods.

2. Related Art

One type of commonly used boiling water nuclear reactor employs a nuclear fuel assembly comprised of fuel rods surrounded by a fuel channel. Each fuel channel of a boiling water reactor fuel assembly typically includes a hollow, linear, elongated, four-sided channel of integral construction, which except for its rounded corner edges, has a substantially square cross section. Commonly, each channel is roughly 14 feet (4.27 meters) long by 5 inches (12.7 cms.) and laterally encloses a plurality of elongated fuel elements. The fuel elements are arranged to allow for the insertion of a cruciform-shaped control rod, which during reactor operation, is movable vertically to control the nuclear reaction. The control rods typically include an upper portion having a handle and four upper rollers for guiding the control rod as it moves vertically and a lower portion comprising a lower casting and lower ball rollers. The main body structure includes four blades or panels which extend radially from a central spline. Preferably, the blades extend longitudinally to a height that substantially equals the height of the fuel elements, which is approximately 12 feet (2.6 meters). The width of the control rods at the blade section is approximately twice the width of the panels, which is in the order of 10 inches (25.4 cms.).

Following functional service, boiling water reactor control rods are difficult to store and dispose of because of their size, configuration, embrittled condition and radiological activity. Heretofore, within the United States, in-pool storage of certain irradiated hardware has been extremely space inefficient and dry cask storage is not currently readily available. Accordingly, boiling water reactor operators must necessarily dispose of irradiated control rods as soon as reasonably practical.

Irradiated control rods are typically class C, low level radioactive waste as defined and determined pursuant to 10 CFR §61 and related regulatory guidance, e.g., NRC's *Branch Technical Position on Concentration Averaging and Encapsulation*. Since Jul. 1, 2008, low level radioactive waste generators within the United States that are located outside the Atlantic Compact (Connecticut, New Jersey and South Carolina) have not had access to class B or class C, low level radioactive waste disposal capacity. Lack of disposal capacity has caused boiling water reactor operators considerable spent fuel pool overcrowding. Though currently very uncertain and subject to numerous regulatory and commercial challenges, class B and class C low level radioactive waste disposal capacity for the remainder of the United States low level radioactive waste generators is anticipated in the relatively near future. Even when waste disposal sites become available, much of the irradiated control rods will be difficult and expensive to ship because of their size and configuration unless their volume can be significantly reduced and tightly compacted into licensed shipping casks. Disposal and long term and/or indefinite storage of control rod blades is technically challenging and commercially expensive. Decommissioning is typically best achieved by segmentation into predetermined sizes to achieve optimal physical and radiological characteristics. Segmentation is performed within the reactor facilities' spent fuel pool. One method of segmentation is described in co-pending Application Ser. No. 13/612,905, filed concurrently herewith, entitled METHOD OF SEGMENTING IRRADIATED BOILING WATER REACTOR CONTROL ROD BLADES. Generally, that method makes two orthogonal cuts longitudinally down the central spline of the control rod separating the cruciform formed blades into four equal panels, which can then be laterally segmented to a desired size suitable for cask storage or shipping.

More particularly, the principal components of one form of boiling water reactor control rod are the lifting handle, stellite roller bearings, velocity limiter, and the cruciform-shaped main blade body. The former components are positioned at the extremities of the control rod cruciform-shaped main body, and preferably, are removed in a manner consistent with the prior art as part of the control rod volume reduction process. The cruciform-shaped main body is comprised of four sheathed, metallic panels of metallic tubes containing powdered boron carbide or other neutron absorbing material, that are welded to a central spline lengthwise at opposing angles to fashion the cruciform shape. Underwater lateral segmentation of the panels ruptures both the sheathing and the tubes contained within the sheathing thereby exposing a spent fuel pool to unwanted debris in the form of sheathing materials, tubes and boron carbide. Embrittlement of the control rods caused by neutron exposure compounds the difficulty of lateral segmentation. The process described in the foregoing co-pending application solves this problem by wrapping a band of malleable metal laterally around the blades at the point where the cladding is to be laterally cut and crimping the malleable metal which seals the cladding at the point of segmentation so it can be cut.

While being serviced within the reactor pressure vessel, certain constituents of the control rod blades when exposed to the neutron fuel associated with nuclear fission cause the formation of the radioisotope tritium. Following useful service, continuing through storage and ultimately disposition, certain amounts of tritium may remain with the control rod blades that can be released into the spent fuel pool during the lateral segmentation process, which would be undesirable.

Accordingly, it is an object of this invention to remove the tritium from the control rods prior to lateral segmentation.

Furthermore, it is an additional object of this invention to capture the tritium removed from the control rod, in a stable form in which it can be easily contained.

SUMMARY

These and other objects are achieved by an improved method for extracting tritium from irradiated boiling water reactor control rods having cruciform-shaped blades that have been removed from service. The control rod blades have an elongated dimension along the axial length thereof with a clad exterior and an interior chamber housing a neutron absorbing material. The method comprises the steps of connecting a conduit to the interior of the clad exterior in a substantially closed loop from an inlet penetration through the clad exterior substantially at a first end along the elongated dimension of the clad exterior to an outlet penetration through the clad exterior substantially at a second end along the elongated dimension of the clad exterior. A carrier fluid is transported into the inlet and out the outlet and through the conduit with the carrier fluid exiting the outlet and being passed through a tritium getter filter before the carrier fluid is returned to the inlet. Preferably, the carrier fluid is a gas chosen from either argon or oxygen and is heated prior to entering the inlet penetration. In one embodiment, the tritium getter filter has an active ingredient comprising yttrium or zirconium or a combination thereof.

Preferably, the carrier fluid is pumped under pressure into the inlet. In another embodiment, the carrier fluid is transported under vacuum which draws the carrier fluid from the outlet. Alternatively, the carrier fluid may be transported by a combination thereof that pumps the carrier fluid into the inlet and draws it through with the vacuum on the outlet.

The method may also include the step of segmenting the cruciform-shaped control rod blades longitudinally along the central spline to separate the blades into four separate panels. A first band of malleable metal is placed laterally around at least some of the panels substantially at the first end and a second band of malleable metal is placed around the at least some of the panels substantially at the second end. The bands of malleable metal are then crimped to the clad exterior of the panels and an inlet and an outlet are respectively formed through the bands of malleable metal.

BRIEF DESCRIPTION OF THE DRAWINGS

A further understanding of the invention claimed hereafter can be gained from the following description of the preferred embodiments when read in conjunction with the accompanying drawings in which:

DESCRIPTION OF THE PREFERRED EMBODIMENT

Figure 1:
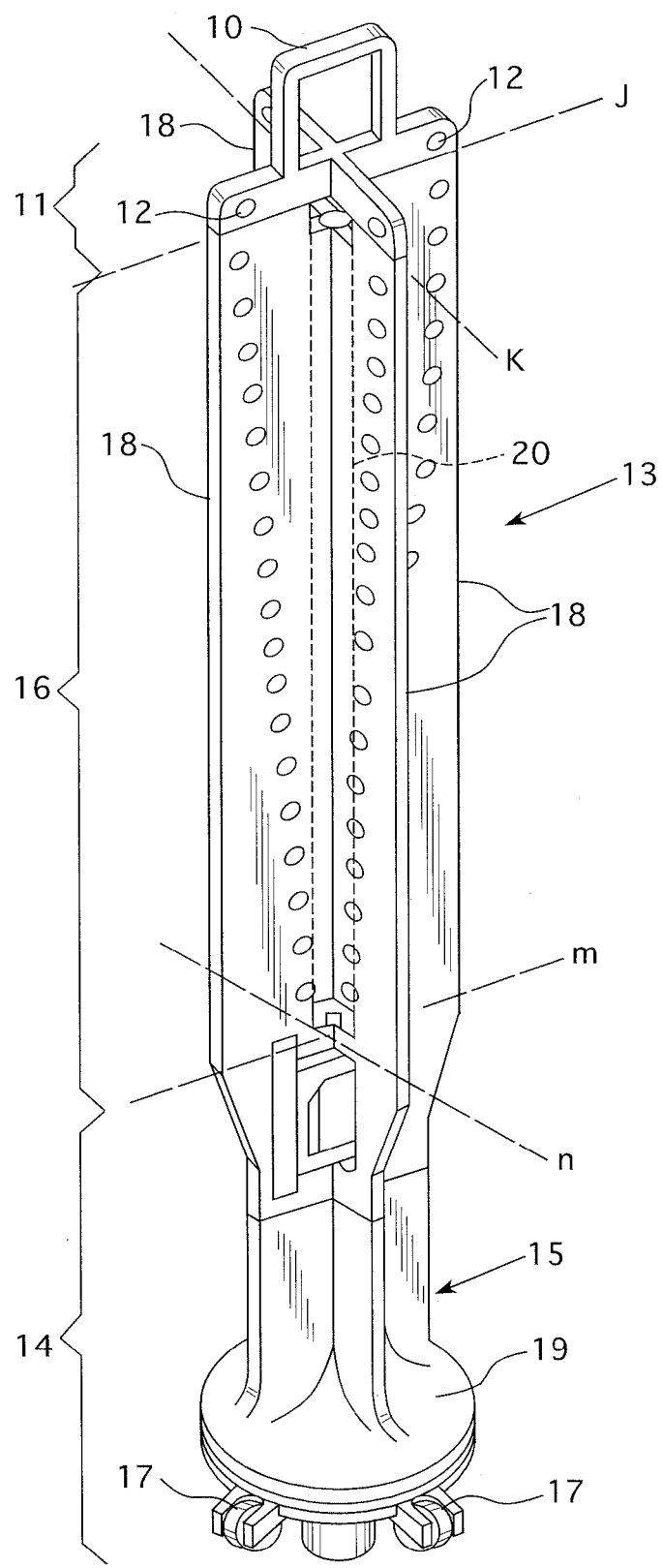
FIG. 1 illustrates a boiling water reactor control rod blade of the type to which the present invention is applicable.

FIG. 1 shows a boiling water reactor control rod blade 13 of the type to which the present invention is applicable. As such, the control rod blade comprises an upper portion 11 having an upper handle 10 and four upper ball rollers 12; a lower portion 14 having a lower casting 15 and lower ball rollers 17; and a main body blade structure 16 therebetween. The main blade structure 16 includes four panels or blades 18 arranged in a cruciform shape about a central spline 20. The control rod illustrated in FIG. 1 is an American design. There is also a Nordic and a German version which are generally similar, each having a corresponding center section 16 with four radially extending blades at 90° intervals. Because of the geometry of the blades and their extended length of fourteen feet, it should be obvious that it would be inefficient to store the blades for long term storage or package the blades in casks for shipment, in their current form. Some form of consolidation is required to make storage or packaging more efficient, which has to be performed under water to shield workers from radiation. One form of consolidation is described in application Ser. No. 13/612,905, filed. Sep. 13, 2012, entitled METHOD OF SEGMENTING IRRADIATED BOILING WATER REACTOR CONTROL ROD BLADES, filed concurrently herewith). According to that method, the lower portion 14 is removed by cutting approximately in the plane defined by lines m and n, and the upper portion 11 is removed by cutting in a transverse plane defined by lines j and k. Another alternative is to just cut around the rollers 12 and 17 to remove them or to leave the handle 10 in place. Although it is possible to practice the invention without removing the rollers, it is desirable to do so since they typically contain cobalt and from a radiological perspective, are reactively much hotter than the other portions of the control rod blade.

For the general purposes of this description, the principal components of such a control rod blade are an upper portion containing the lifting handle 10 and the stellite rollers 12, a lower portion 14 containing the velocity limiter 19 and stellite rollers 17 and a central portion containing the cruciform-shaped main body 16 including the blades or panels 18 and the central spline 20. To consolidate the control rod blade section 16, the upper portion 11 and the lower portion 14 are first removed in a manner consistent with existing art as part of the control rod blade volume reduction process.

Figure 2:
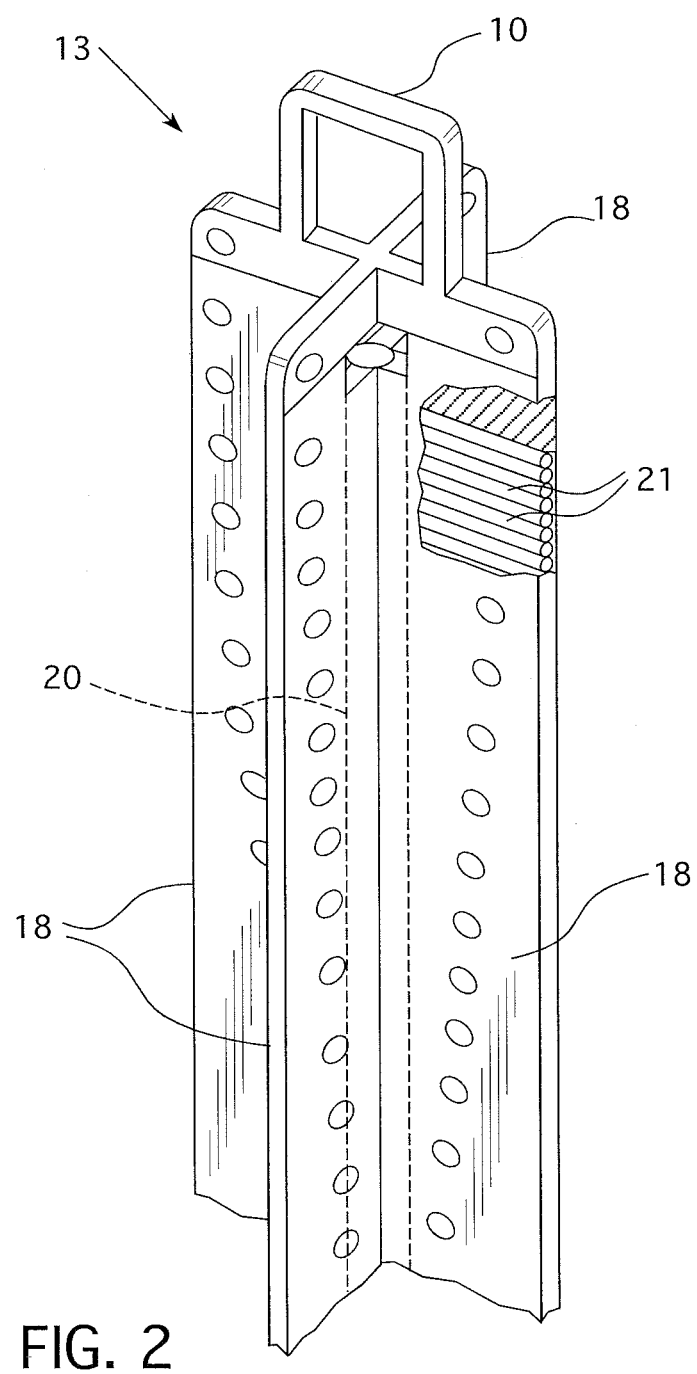
FIG. 2 is an isometric view of an upper segment of the control rod blade of FIG. 1 with a portion of one of the blades cut away to show the interior tubes that house the neutron absorbing material.

The cruciform-shaped main body 16 is comprised of four sheathed metallic "panels" 18 of metallic tubes 21 which extend laterally and are stacked in a tandem array as illustrated in the cut-away portion of the control rod blade panel 18 shown in FIG. 2. The metallic tubes contain powered boron carbide or other neutron absorbing material. The panels 18 are welded to the central spline 20 lengthwise at opposing angles to form the cruciform shape. As previously mentioned, because of the radioactive nature of the control rod, it is necessary for the consolidation process to be performed under water, most preferably in the spent fuel pool. To separate the control rod into practically transportable segments or segments that can be more efficiently stored in a spent fuel pool, it will be necessary to longitudinally segment the main body portion 16 so that the panels 18 can be stacked or further, laterally segmented, so they can fit into casks for transport. However, under water lateral segmentation of the panels 18 will rupture both the sheathing and the tubes containing the neutron absorbing material within the sheathing of the panels 18 thereby exposing the spent fuel pool to unwanted debris in the form of sheathing material, tubes and boron carbide. In addition, the tritium that was formed within the sheaths during neutron exposure will also be released. While the method of segmentation provided for in application Ser. No. 13/612,905, filed Sep. 13, 2012, should readily contain the fractured sheathing materials, tubes and boron carbide, the tritium is more difficult to contain once the sheathing has been breached. The invention claimed hereafter provides a means for removing the tritium and capturing the gas in a stable form before lateral segmentation is initiated.

Figure 3A:
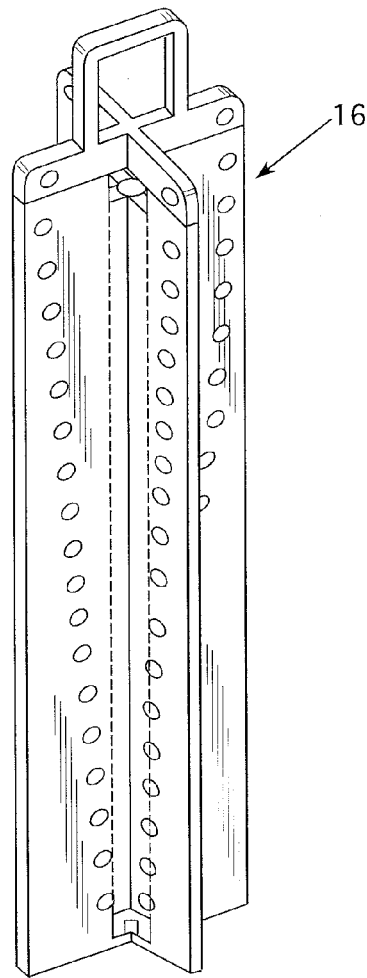
FIG. 3 is a schematic diagram showing different stages of the process of one embodiment of this invention.
Figure 3B:
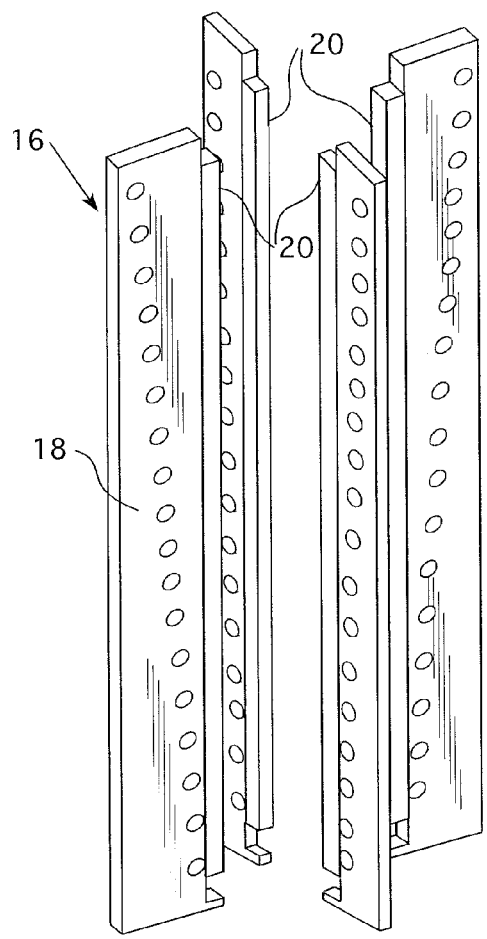
Figure 3C:
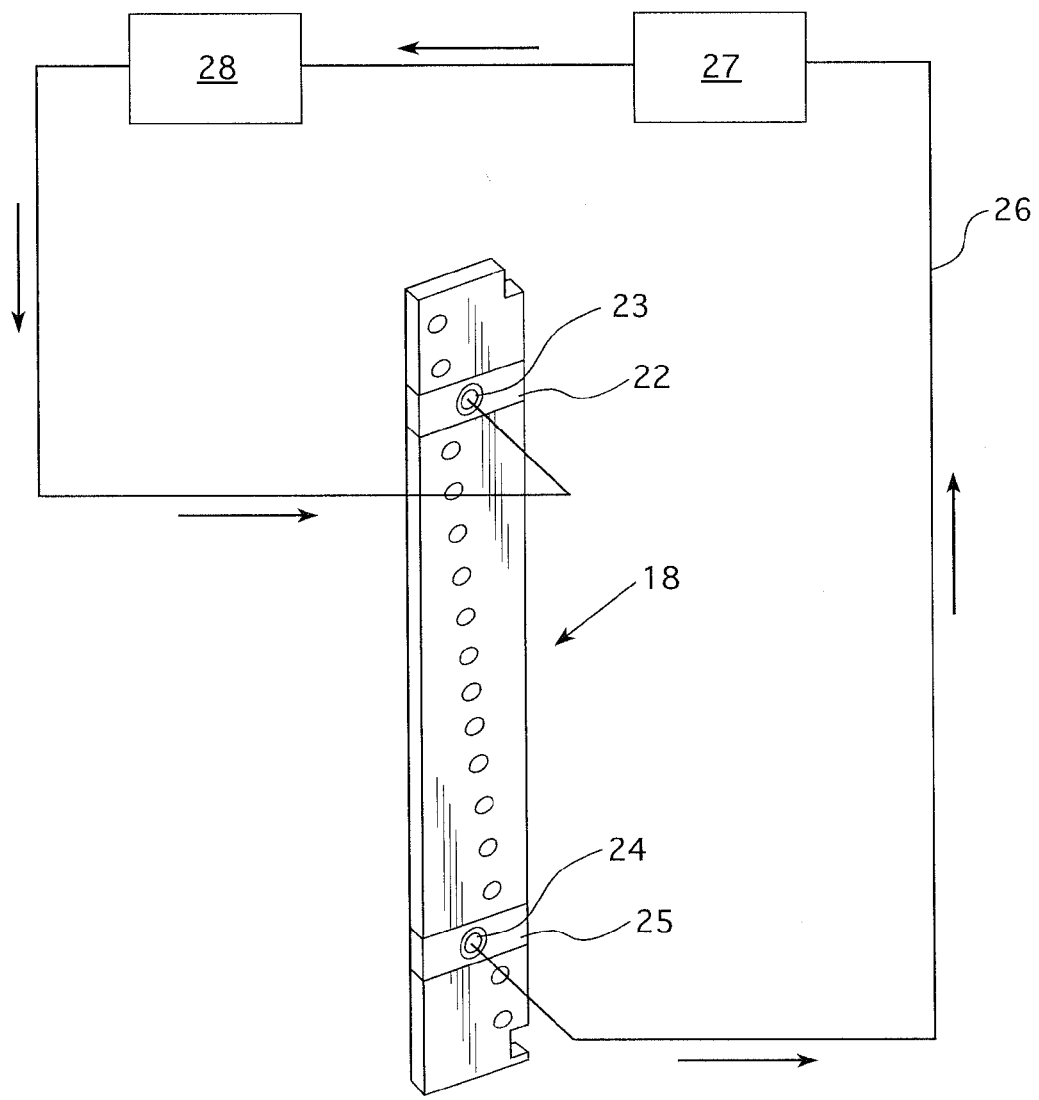

FIG. 3 is a schematic road map of the steps of one embodiment of this invention. In FIG. 3(a), the upper and lower segments 11 and 14 have been removed. In FIG. 3(b), the main body blade section 16 has been axially segmented along the spline 20 to separate the main body section 16 into four flat panels 18, as described in co-pending Application Ser. No. 13/612.905 filed Sep. 13, 2012, FIG. 3(c) shows one embodiment of this invention being applied to one of the panels 18. A band of malleable metal 22 is wrapped tightly, laterally around an upper portion of the panel 18, though it should be appreciated that the figures are not drawn to scale and, for the purpose of simplicity, the bands shown in FIG.

3(c) are exaggerated in size. It should also be appreciated that the bands may be preformed and slid over the top of the surface of the cladding on the panel 18. The band may, for example, be constructed from 303-type stainless steel and preferably would be approximately 4 to 6 inches (10.16 to 15.24 cm.) in width and approximately ⅛ inch (0.32 cm.) thick, though it should be further appreciated that other malleable metals and dimensions may be similarly employed. A similar band 24 is wrapped around the lower portion of the panel 18 in a similar manner. With the bands positioned as just described, the panel will be crimped around their circumference at the band locations. The crimped bands 22 and 24, are intended to limit or eliminate panel sheathing spring back, and to capture shattered sheathing and tubing material that have been embrittled by neutron exposure, that could otherwise shatter when the penetrations are machined into the cladding to extract the tritium. Once penetrated and the tritium removed, the panel sections may be handled and packed in a manner that optimizes physical and radiological efficiency.

The penetrations into the containment bands 22 and 24 and the panel 18 may take the form of drilled holes 23 and 25. Once the penetrations are made, gaskets may be fitted in the resulting opening and a flanged conduit 26 is inserted into each penetration to seal and facilitate the inlet or inflow and outlet or outflow of the gaseous phase elements, e.g., the tritium and any carrier gas that may be employed to transport the tritium out of the panel 18. The carrier gas may be, for example, oxygen or argon. Thus, the gaseous transport carrier is introduced into one penetration of the panel 18 and extracted from the opposing end. For example, the system may be a closed loop and may employ a pressurized carrier gas that is infused into the panel or extricated from the panel using a vacuum or a combination thereof. Furthermore, the system may employ a heated gaseous carrier.

Tritium will be extricated from the panel at the outlet 25 along with the carrier gas. The gaseous extraction system includes a filter 27 having an active ingredient which will getter the tritium such as yttrium or zirconium. The gas from the outlet is conveyed by way of conduit 26 to the filter 27 and from the filter to the pump 28, shown in FIG. 3(c), which returns the cleansed carrier gas to the inlet 23. Following extraction of tritium as just described, the panel 18 may be volume-reduced in accordance with the method described in co-pending Application Ser. No. 13/612.905, filed Sep. 13, 2012. The tritium may then be disposed of separately.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method for extracting tritium from an irradiated boiling water reactor control rod having cruciform shaped blades that have been removed from service, the control rod blades having an elongated dimension along an axial length thereof, a clad exterior and an interior chamber housing a neutron absorbing material, the method comprising the steps of:
   segmenting the cruciform shaped control rod blades longitudinally along a central spline to separate the blades into four separate panels;
   separately placing a first band of malleable metal laterally around at least some of the panels, respectively, substantially at a first end;
   separately placing a second band of malleable metal around the at least some of the panels, respectively, substantially at a second end;
   crimping the bands of malleable metal to the clad exterior of the panels;
   forming an inlet penetration through the band of malleable metal and clad exterior of the panels at the first end;
   forming an outlet penetration through the band of malleable metal and clad exterior of the panels at the second end;
   connecting a conduit to the interior of the clad exterior of the panels in a substantially closed loop from the inlet penetration through the clad exterior of the panels substantially at the first end along the elongated dimension of the clad exterior of the panels to the outlet penetration through the clad exterior of the panels substantially at the second end along the elongated dimension of the clad exterior of the panels;
   transporting a carrier fluid into the inlet penetration and out the outlet penetration and through the conduit; and
   passing the carrier fluid from the outlet penetration through a tritium getter filter before returning the carrier fluid to the inlet penetration.

2. The method of claim 1 wherein the carrier fluid is a gas.

3. The method of claim 2 wherein the gas is either oxygen or argon.

4. The method of claim 1 wherein the carrier fluid is heated prior to entering the inlet penetration.

5. The method of claim 1 wherein the tritium getter filter has an active ingredient comprising yttrium or zirconium.

6. The method of claim 1 wherein the step of transporting the carrier fluid includes the step of pumping the carrier fluid under pressure.

7. The method of claim 1 wherein the step of transporting the carrier fluid includes the step of drawing the carrier fluid through the conduit with a vacuum.

8. The method of claim 1 wherein the bands of malleable metal are formed from 303 stainless steel.

9. The method of claim 1 wherein the bands of malleable metal are approximately ⅛ in. (0.32 cm.) thick and 4 to 6 in. (10.16 to 15.24 cm.) in width.

\* \* \* \* \*